(12) United States Patent
Potyrailo et al.

(10) Patent No.: US 10,948,400 B1
(45) Date of Patent: Mar. 16, 2021

(54) SENSOR PROBE ASSEMBLY AND METHOD OF FORMING

(71) Applicant: General Electric Company, Schenectady, NY (US)

(72) Inventors: Radislav Alexandrovich Potyrailo, Niskayuna, NY (US); Jared Timothy Hale, Niskayuna, NY (US); Christian M. Heller, Albany, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/573,721

(22) Filed: Sep. 17, 2019

(51) Int. Cl.
*G01J 3/44* (2006.01)
*G01N 21/05* (2006.01)
*G01N 21/31* (2006.01)
*G01N 21/47* (2006.01)
*G01N 21/01* (2006.01)

(52) U.S. Cl.
CPC .............. *G01N 21/05* (2013.01); *G01N 21/31* (2013.01); *G01N 21/47* (2013.01); *G01N 2021/0193* (2013.01)

(58) Field of Classification Search
CPC .................. G01N 21/65; G01N 21/658; G01N 2021/656; G01J 3/44; G01J 3/02
USPC ........................................................ 356/301
See application file for complete search history.

(56) References Cited

U.S. PATENT DOCUMENTS

| | | | |
|---|---|---|---|
| 5,792,237 A | 8/1998 | Hung et al. | |
| 7,272,525 B2 | 9/2007 | Bennet et al. | |
| 8,361,021 B2 | 1/2013 | Wang et al. | |
| 8,420,025 B2 | 4/2013 | Potyrailo et al. | |
| 8,968,674 B2 | 3/2015 | Lee et al. | |
| 9,335,250 B2 | 5/2016 | Trainoff | |
| 9,464,982 B2 * | 10/2016 | Tokhtuev | G01N 21/645 |
| 10,058,861 B2 | 8/2018 | Pereira et al. | |
| 2011/0267603 A1 | 11/2011 | Shaw | |
| 2013/0256557 A1 * | 10/2013 | Tokhtuev | G01N 21/05 |
| | | | 250/438 |

OTHER PUBLICATIONS

Shaefer et al., "Lofting Curve Networks using Subdivision Surfaces", Eurographics Symposium on Geometry Processing (2004), The Eurographics Association (12 pages).
Liang et al. "Experimental Result Comparisons of Curve Fitting Algorithms on Fluid Path Lines Modeling in Strengthen Grinding Flow Field" Experimental Techniques, Apr. 2016, vol. 40 Issue: 2 pp. 715-735.
Lin et al. "A surface-lofting approach for smooth-surface reconstruction from 3D measurement data" Computers in Industry, Oct. 1997, vol. 34 Issue: 1 pp. 73-85.

* cited by examiner

*Primary Examiner* — Md M Rahman
(74) *Attorney, Agent, or Firm* — The Small Patent Law Group LLC; Josef L. Hoffmann

(57) ABSTRACT

A method of forming an optical transmission flow cell that includes forming a fluid pathway cavity though a housing, and forming an optical pathway cavity through the housing and through the fluid pathway cavity, the optical pathway cavity configured to receive an optical fiber to emit light through the fluid pathway cavity. Material is added at a transition between the optical pathway cavity and fluid pathway cavity to form a surface at the transition configured to prevent formation of air pockets within fluid in the optical pathway cavity.

16 Claims, 6 Drawing Sheets

SENSOR PROBE ASSEMBLY AND METHOD OF FORMING

FIELD

The subject matter described herein relates to sensor probe assemblies, and methods for manufacturing the same.

BACKGROUND

Identifying fluid substances using optical based methods such as ultraviolet visible spectrum (UV-VIS) spectroscopy, luminescence, vibrational spectroscopy, or the like can require substantial accuracy in measurements. Real-time monitoring of these diverse fluids, including liquids, emulsions, or the like can be critical for process control. Often, such real time monitoring involves detection of at least one chemical component or all chemical constituents of the fluid. To achieve this goal, sensor probes are utilized in the form of a physical transducer in operational contact with the fluid and the auxiliary components of the sensor probe to bring the signal to and from the sensor probe. Sensor probes can utilize different detection principles where the sensor probe deliver a certain type of energy to the fluid and detects the change in this delivered energy as a result of an interaction with the fluid. Nonlimiting examples of such energy include electromagnetic, electric, acoustic, mechanical, thermal energy. Non-limiting examples include electrical detection principles such as conductivity, capacitance, impedance, and optical detection principles such as UV-VIS spectroscopy, luminescence, near-infrared spectroscopy, infrared spectroscopy, vibrational spectroscopy. The probe types can involve transmission- or insert-types of probes. One example of a transmission-type probe is a flow cell.

A flow cell provides fluid into contact with energy created by the probe. Thus, each flow cell includes an inlet for providing the fluid to be tested, and an inlet for infrared light, ultraviolet light, sound, or similar energy types to come in contact with the fluid.

A common challenge in conventional sensor probes is the formation of pockets of air, or air bubbles, and other types of inhomogeneities on the probe surface or in the detection region that adversely affect the sensor response. The common adverse effect is the loss of accuracy of measurements resulting from the pockets of air and other types of inhomogeneities. Specifically, the pockets of air prevent the full contact of the needed sample volume with the energy delivered by the probe.

BRIEF DESCRIPTION

In one or more embodiments, a method is provided for forming an optical transmission flow cell that includes forming a fluid pathway cavity though a housing and forming an optical pathway cavity through the housing and through the fluid pathway cavity. The optical pathway cavity is configured to receive an optical fiber to emit light through the fluid pathway cavity. Material is added within the fluid pathway cavity to form at least one arcuate loft surface within the fluid pathway cavity. The at least one arcuate loft surface is configured to promote laminar flow of fluid within the fluid pathway cavity.

In one or more other embodiments, a sensor probe assembly is provided that includes an energy source and an optical transmission flow cell. The flow cell receives a light input from the energy source along an optical pathway within an optical pathway cavity. The flow cell is coupled to a detector so that the light from the energy source is delivered to the detector. The optical transmission flow cell includes a fluid pathway cavity that has an arcuate surface that intersects with the optical pathway cavity so that a fluid flow path from a fluid pathway cavity inlet to a fluid pathway cavity outlet is within the optical pathway. A fluid source is fluidly coupled to the optical transmission flow cell and the fluid source is configured to supply fluid into the fluid pathway cavity against the arcuate surface that reduces formation of air pockets in the fluid within the fluid pathway cavity before the fluid flows into the optical pathway along the fluid flow path.

In one or more embodiments, a method of forming an optical transmission flow cell is provided that includes printing a housing having a fluid pathway cavity disposed therethrough. The fluid pathway cavity includes a first fluid pathway channel and a second fluid pathway channel. During the printing of the housing, a first arcuate loft surface is lofted in the first fluid pathway channel, and a second arcuate loft surface is lofted in the second fluid pathway channel. During the printing of the housing, an optical pathway cavity is formed to be disposed through the housing and transverse to the fluid pathway cavity. The optical pathway cavity creates a fluid flow path through the first fluid pathway channel against the first arcuate loft surface, into the optical pathway cavity, and through the second fluid pathway channel against the second arcuate loft surface. The optical pathway cavity is configured to cause a projection of light therethrough to be disposed through a fluid in the fluid flow path after passing through the first fluid pathway channel against the first arcuate loft surface.

BRIEF DESCRIPTION OF THE DRAWINGS

A full and enabling disclosure of the present disclosure is set forth in the specification, which refers to the appended Figures, in which.

DETAILED DESCRIPTION

Figure 1:
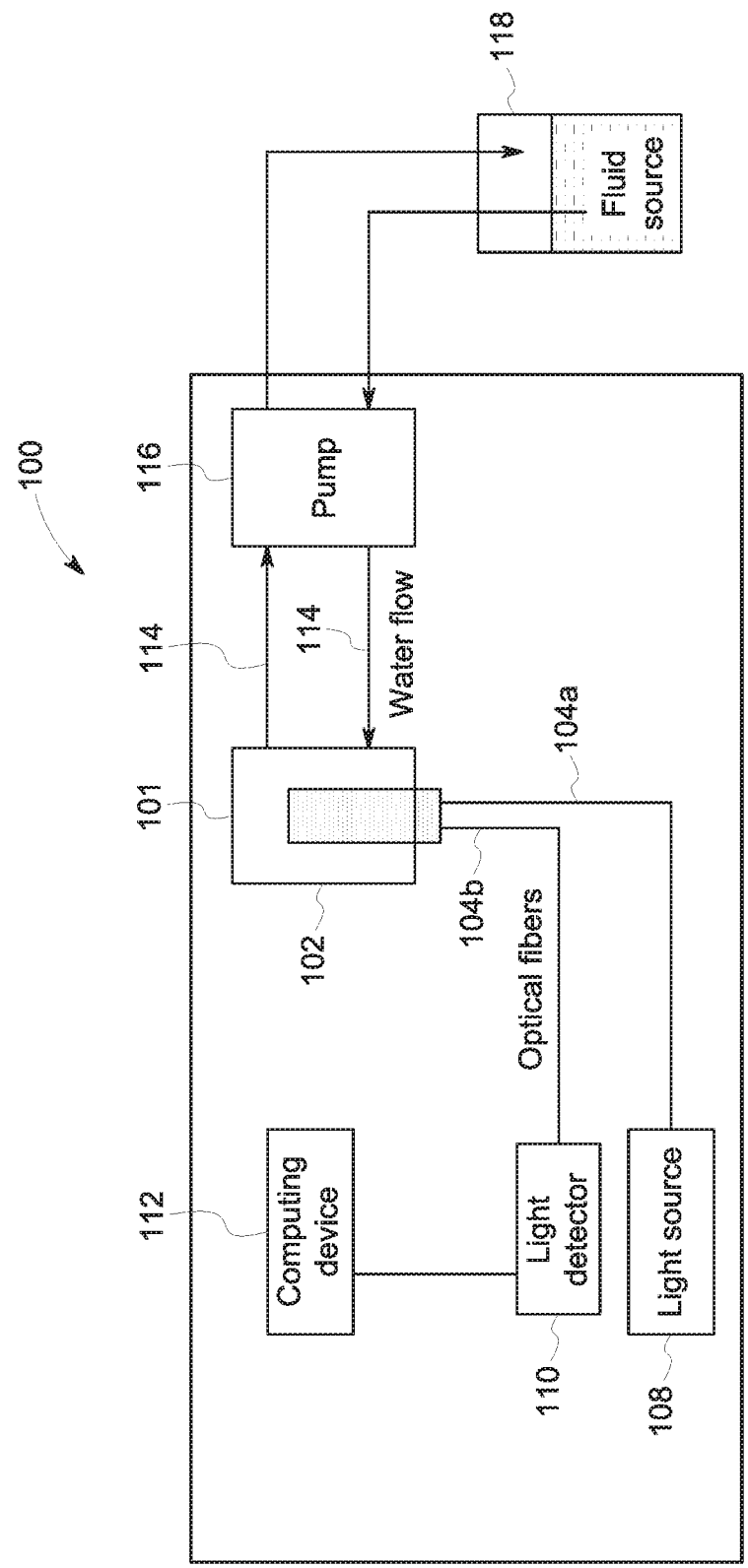
FIG. 1 is a schematic diagram of an example optical transmission flow cell in accordance with embodiments herein.

Reference now will be made in detail to embodiments of the present disclosure, one or more examples of which are illustrated in the drawings. Each example is provided by way of explanation of the present disclosure, and is not a limitation of the present disclosure. For instance, features illustrated or described as part of one embodiment can be used with another embodiment to yield a still further embodiment. Thus, it is intended that the present disclosure covers such modifications and variations as come within the scope of the appended claims and their equivalents.

Lofting includes creating a curved, or arcuate, shape by specifying a network of curves that approximate the desired shape and interpolating these curves with a smooth surface through an additive manufacturing process. An arcuate loft surface refers to a surface formed from lofting. One example additive manufacturing process that provides lofting is a three-dimensional (3-D) printing process where a nozzle and additive materials are used to form a structure. The structure may be a body, housing, transmission flow cell, or the like. In particular, while an arcuate surface may be formed by any manufacturing method, an arcuate loft surface must be formed using an additive process such as through 3-D printing. In this disclosure printing may include 3-D printing, additive manufacturing, or the like.

Figure 3:
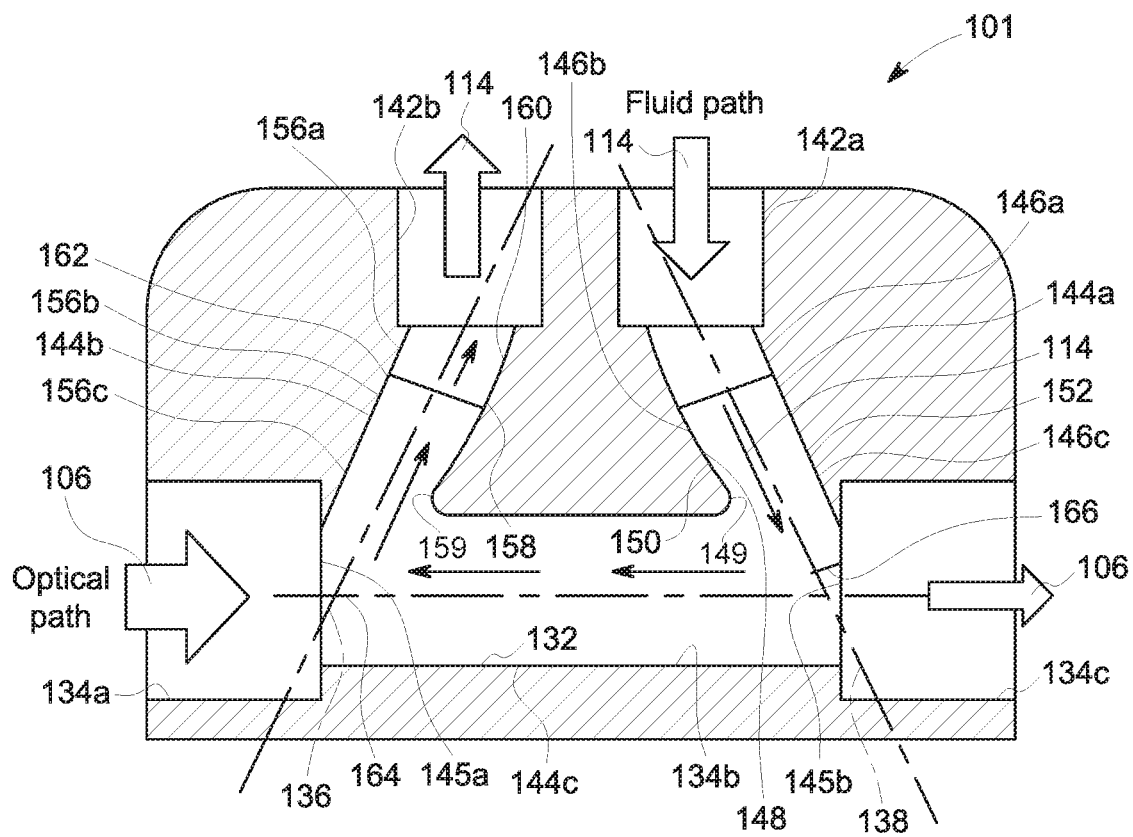
FIG. 3 is a section view of an example optical transmission flow cell in accordance with embodiments herein.

FIG. 1 illustrates a schematic diagram of an optical transmission flow cell system 100 that includes a transmission flow cell 101 with a housing 102. The housing 102 receives a first optical fiber 104a and a second optical fiber 104b to provide an optical pathway 106 (FIG. 3). The optical pathway 106 (FIG. 3) extends from an energy source 108 within the housing 102 to a detector 110 that is coupled to a computing device 112 for processing. In one example, the detector 110 is a spectrograph. The optical pathway 106 extends through a fluid flow path 114 (FIG. 3) that receives fluid from a fluid source 118 via a pump 116. The fluid source 118 may be a container, beaker, tank, or the like, that holds or contains fluid that is to be analyzed by the detector 110. In this example embodiment, the optical transmission flow cell system 100 is illustrated with the detector 110, computing device 112, pump 116, and fluid source 118 remote, or separate from, the optical transmission flow cell 101. Still, in other examples, the optical transmission flow cell 101, detector 110, computing device 112, pump 116, and fluid source 118 may be within a common housing, containment unit, or the like.

The first optical fiber 104a and second optical fiber 104b may be included in a bundle of optical fibers. In an example, the first optical fiber 104A directs or conveys light from the energy source 108 to the optical pathway 106 within the housing 102. In another example, the light is transmitted through the second optical fiber 104b from the optical pathway 106 within the housing 102 to the detector 110. The optical fibers 104a and 104b may extend along straight paths, may bend, or have curves to position the energy source 108 in relation to the optical transmission flow cell 101 to accommodate spatial constraints. Similarly, the length of each optical fiber 104a and 104b can depend on the spatial requirements for the optical transmission flow cell system 100.

The energy source 108 may include a laser, infrared light source, LED (light emitting diode) light source, ultraviolet (UV) light source, a halogen light source, a deuterium light source, or the like, that transmits light, or inputs light, through an optical fiber 104a for delivery of light into the optical transmission flow cell 101. In one example, the energy source 108 emits UV light in a range of wavelengths as desired for a detector 110 to receive UV-VIS light. In one example the energy source 108 is a light source and the detector 110 is a light detector. Alternatively, in another example, the energy source is an acoustic wave generating device and the detector is an acoustic wave detector. In yet another example, the energy source 108 emits infrared radiation and the detector 110 is an infrared detector.

The detector 110 can be an instrument that includes a computing device 112 to measure properties of light over a given spectrum to identify materials, or the consistency of a material or fluid. The detector 110 may measure the intensity of received light, the polarization state of received light, or the like, so one or more processors of the accompanying computing device 112 may determine the individual elements of a fluid flowing through the optical transmission flow cell 101. The detector 110 measures the wavelength, or photon energy to make these determinations. Often, the measurement is made in electron volts (eV) spectrum, wavelengths spectrum, counts at a given spectral position, or amperes at a given spectral position. In one example the detector 110 is a 16-bit Ocean Optics™ spectrograph. Light is emitted through a fluid of interest within the transmission flow cell 101 via the first optical fiber 104a and received by the second optical fiber 104b and transmitted to the detector 110 accordingly. The detector then determines the spectrum of the light received, such as in one example determining the eV spectrum of the received light. Then, based on the spectrum of the emitted light from the energy source 108, the detector 110 may determine changes in the spectrum of the light resulting from the transmission of the light through the fluid.

In one embodiment, light is delivered to the flow cell 101 by using optical fibers. In another embodiment, light is delivered to the flow cell 101 by using lenses and other light-focusing and control optical elements that propagate light in the free space rather than via optical fibers.

In one embodiment, light is delivered to the flow cell 101 and measurements are performed in the transmission mode where light enters into the first end of the flow cell 101, interacts with the fluid in the flow cell 101 and leaves the flow cell 101 from the second end of the flow cell 101.

In one embodiment, light is delivered to the flow cell 101 and measurements are performed in the reflection mode where light enters into the first end of the flow cell 101, interacts with the fluid in the flow cell 101, reflects from an auxiliary reflector element and leaves the flow cell 101 from the same first end of the flow cell 101. Reflection mode can be reflection of the light delivered by the light source or collection of a luminescent or scattered light generated by the fluid upon an excitation by the light source. Nonlimiting examples may include fluorescence, time-resolved fluorescence, phosphorescence, Raman scattering.

In one embodiment, fluid may be moved by using a pump, gravity, or any other forces that can move a fluid in a process flow, manufacturing flow, industrial flow, or consumer appliance flow. Nonlimiting examples of such flows include biopharmaceutical production, chemical production, fermentation production, materials manufacturing, consumer washing machine, consumer dishwashing machine, industrial washing machine, industrial dishwashing machine.

The computing device 112 and the detector 110 may communicate with each other via one or more wired and/or wireless connections. The computing device 112 may include one or more processors, a database, or memory device, a transponder, transceiver, transmitter, receiver, input devices, output devices, or the like. The output device may be a display device that displays the spectrum-related and material-related data and information. Alternatively, the detector 110 includes one or more processors, database or memory, transponder, input devices, and/or output devices, or the like, that determines spectrum-related and material related data and information.

Figure 2:
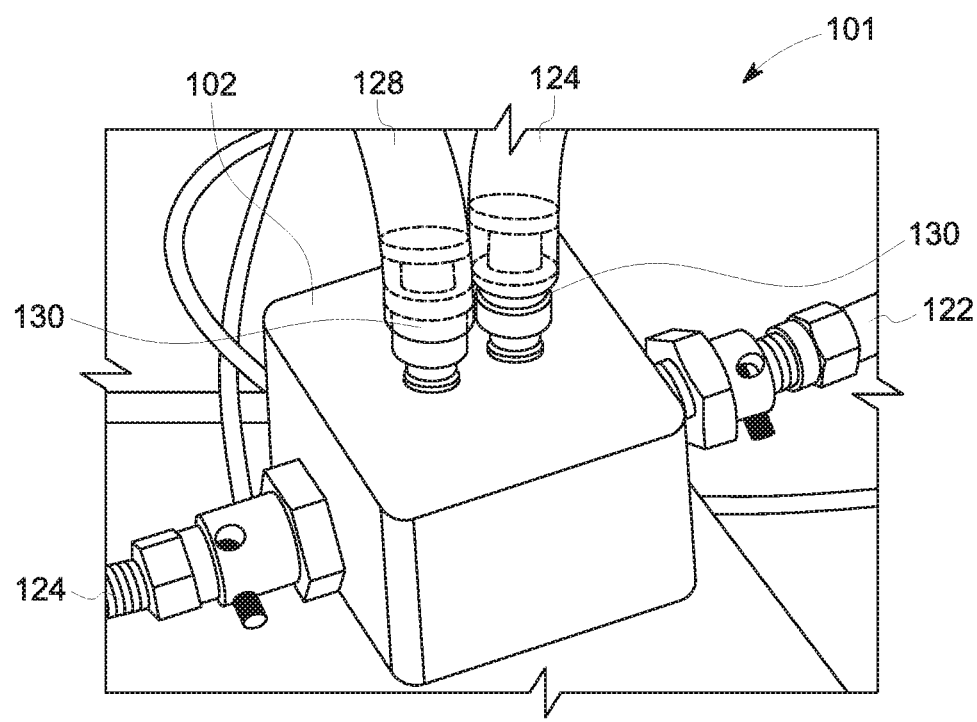
FIG. 2 is a perspective view of an example optical transmission flow cell in accordance with embodiments herein.

FIG. 2 illustrates a perspective view of the optical transmission flow cell 101 of FIG. 1. As illustrated, the optical transmission flow cell 101 includes the housing 102 that receives an inlet fiber optic conduit 120 that couples the transmission flow cell 101 to the energy source 108. The inlet fiber optic conduit 120 in this example is mechanically coupled and removably secured to the transmission flow cell 101 via a threaded coupling connection. Similarly, an outlet fiber optic conduit 122 can be removably secured to the transmission flow cell 101 via a threaded coupling connection. The inlet fiber optic conduit 120 includes the first optical fiber 104a (FIG. 3) while the outlet fiber optic conduit 122 includes the second optical fiber 104b to define the optical pathway 106 into, through, and out of the optical transmission flow cell 101.

The housing 102 also receives an inlet fluid conduit 124 that is mechanically and/or sealingly coupled to the optical transmission flow cell 101. While in one example the inlet fluid conduit 124 is formed from a rigid material, such as a metal, in other example embodiments the inlet fluid conduit 124 may be flexible and may be made from ceramic, plastic, rubber, or the like. The inlet fluid conduit 124 may couple to the optical transmission flow cell 101 directly, or optionally, may fluidly couple to an elongated inlet port duct 126 that may be removably attached within the optical transmission flow cell 101. In one embodiment, the elongated inlet port duct 126 is of size and shape to direct water toward an interior surface within the housing 102. Specifically, loft surfaces (as illustrated in FIG. 3) may be provided within the fluid cavity of the optical transmission flow cell 101 to reduce, eliminate, or prevent air pockets such as bubbles within the fluid in the optical pathway 106, and to promote laminar flow. The air pockets in fluid within the optical pathway 106 may cause errors in light measurements taken of the fluid within the flow cell 101. In one example, the elongated inlet port duct 126 includes an arcuate or curved surface that directs the flow of fluid towards the loft surfaces to reduce the existence and formation of air pockets in the fluid and promote laminar flow.

The housing 102 also receives an outlet fluid conduit 128 that is sealingly coupled to the optical transmission flow cell 101. While in one example the outlet fluid conduit 128 is formed from a rigid material, such as a metal, in another example the outlet fluid conduit 128 is flexible and may be made from ceramic, plastic, rubber, or the like. In one example, the inlet fluid conduit 124 and outlet fluid conduit 128 are mechanically and/or sealingly coupled through a compression ring that prevents fluid from leaking at the transition between the outlet fluid conduit 128 and the optical transmission flow cell 101. The outlet fluid conduit 128 may also include an elongated outlet port duct 130 that may be removably attached within the optical transmission flow cell 101. Optionally, to reduce wear on the inlet fluid conduit 124, the pump 116 may reverse flow such that the outlet fluid conduit 128 becomes the inlet fluid conduit 124. In one such embodiment the elongated outlet port duct 130 is of size and shape to direct water towards an interior surface within the housing 102. Specifically, loft surfaces (as illustrated in FIG. 3) may be provided within the fluid cavity of the optical transmission flow cell 101 in order to reduce or eliminate the formation air pockets such as bubbles within the fluid in the optical pathway 106. So, the elongated outlet port duct 130 may be of size and shape to direct the fluid toward loft surfaces within the fluid cavity of the housing 102 when being used as an inlet port duct to reduce air pocket formation that may cause errors in light-based measurements related to the fluid within the cavity. In one example the elongated outlet port duct 130 includes an arcuate or curved surface that directs the flow of fluid towards the loft surfaces.

FIG. 3 illustrates a sectional view of the optical transmission flow cell 101 taken along the lines 3-3 in FIG. 2. Within the housing 102 is an optical pathway cavity 132 that in this example includes an optical pathway inlet channel 134a, an optical pathway flow channel 134b, and an optical pathway outlet channel 134c.

The optical pathway inlet channel 134a is defined by the housing 102 and a transparent or translucent inlet barrier 136 that is disposed through the optical pathway cavity 132 to prevent fluid from within the optical pathway cavity 132 from engaging a first optical fiber 104a that is disposed within the optical pathway inlet channel 134a. In one example the transparent or translucent inlet barrier 136 is an optical window. Alternatively, no transparent inlet barrier 136 is presented and instead, the end of the first optical fiber 104a, or a corresponding bundle of optical fibers, is sealingly covered with a transparent or translucent material. Consequently, the transparent or translucent material prevents the ingress of fluid against the first optical fiber 104a, but allows the emission to light through the optical pathway cavity 132.

The optical pathway flow channel 134b of the optical pathway cavity 132 extends between the transparent inlet barrier 136 to a transparent outlet barrier 138. In this manner, the fluid within the optical transmission flow cell 101 flows through the optical pathway flow channel 134b, but does not engage the first optical fiber 104a or the second optical fiber 104b, but allows for the passage of light along the optical pathway 106 through the fluid within the optical pathway flow channel 134b of the optical pathway cavity 132. The light passes from the first optical fiber 104a to the second optical fiber 104b through the optical pathway flow channel 134b. In this example, the optical pathway flow channel 134b is referred to as a flow channel, because this is the channel that carries the flowing fluid that is being analyzed with the light in the optical pathway 106. In particular, the optical pathway cavity 132 can include any space through which the optical pathway 106 emits within the optical transmission flow cell 101.

The optical pathway cavity 132 intersects, and partially includes the fluid flow path 114, including a third fluid pathway channel 144c. In the example of FIG. 3, the first fluid pathway channel 144a intersects the optical pathway flow channel, the second fluid pathway channel 144b intersects the optical pathway flow channel, and the third fluid pathway channel 144c and optical pathway flow channel 134b are the same channel. In one example, the first fluid pathway channel 144a intersects the optical pathway cavity 132, and specifically the optical pathway flow channel 134b at a first angle 145a in a range between 30° and 150°. Similarly, the second fluid pathway channel 144b intersects the optical pathway cavity 132, and specifically the optical pathway flow channel 134b at a second angle 145b in a range between 30° and 150°. In one example, the first and second angles 145a and 145b are the same, whereas in other examples the first and second angles 145a and 145b are different. In yet another example the first and second angles 145a and 145b are supplementary, while in other examples the first and second angle 145a and 145b are complimentary. In other example embodiments, the third fluid pathway channel 144c may be different from the optical pathway flow channel 134*b*, such as in embodiments when mirrors are utilized to reflect the optical pathway 106 at an angle.

The optical pathway outlet channel 134*c* is defined by the transparent outlet barrier 138 that is disposed through the optical pathway cavity 132 to prevent fluid from within the optical pathway cavity 132 from engaging a second optical fiber 104*b* that is disposed within the optical pathway outlet channel 134*c* and the housing 102. In one example, the transparent outlet barrier 138 is an optical window. Alternatively, the transparent outlet barrier 138 is a sheet of transparent material such as plastic, glass, or the like that prevent fluid from immersing the second optical fiber 104*b*, yet allows for the passage of light therethrough from fluid within the optical pathway flow channel 134*b*. While in this example a transparent outlet barrier 138 is within the optical pathway cavity 132 that separates the optical pathway outlet channel 134*c* and optical pathway flow channel 134*b*, alternatively, no transparent outlet barrier 138 is presented, and instead, the end of the second optical fiber 104*b*, or a corresponding bundle of optical fibers, is sealingly covered with a transparent material as described above.

Within the housing 102 is also a fluid pathway cavity 140 that in this example includes an inlet passage 142*a* that receives the inlet fluid conduit 124, and an outlet passage 142*b* that receives the outlet fluid conduit 128. Each of the inlet passage 142*a* and outlet passage 142*b* can have a uniform diameter for receiving the corresponding fluid conduit 124 and 128. The fluid pathway cavity 140 also includes a first fluid pathway channel 144*a*, a second fluid pathway channel 144*b*, and third fluid pathway channel 144*c*. The third fluid pathway channel 144*c* can transversely extend between the first fluid pathway channel 144*a* and second fluid pathway channel 144*b*. In the example of FIG. 3, the third fluid pathway channel 144*c* is also the optical pathway flow channel 134*b* as described in detail above. In other examples, the third fluid pathway channel 144*c* may be partially disposed within the optical pathway flow channel.

The first fluid pathway channel 144*a* extends from a first end section 146*a* that is adjacent to and is fluidly coupled to the inlet passage 142*a*, to a middle section 146*b*. The middle section then extends to a second end section 146*c* that is adjacent to and fluidly coupled to the third fluid pathway channel 144*c*. The middle section 146*b* has a diameter that is greater than a diameter of the first end section 146*a* and greater than a diameter of the second end section 146*c*. In this manner, the fluid pathway cavity 140 includes a first arcuate surface 148 that in this example has a middle section 146*b* having a diameter that is greater than the diameter of the first end section 146*a* and second end section 146*c*. In one example, as illustrated in FIG. 3, the first arcuate surface is a first arcuate loft surface. Specifically, in one example, the first fluid pathway channel 144*a* is formed using an additive manufacturing process. In one embodiment the additive manufacturing process is printing through use of a three-dimensional (3D) printer that includes spray nozzles for adding material to a surface to form a lofted surface.

In another example, the arcuate surface 148 of the fluid pathway cavity 140 is made from a material having a reflection coefficient that is greater than a reflection coefficient of non-arcuate surfaces of the optical transmission flow cell. In yet another example, the first arcuate surface 148 of the fluid pathway cavity 140 is formed from a material having a density that is greater than a density of material forming non-arcuate surfaces of the optical transmission flow cell 101.

In another example, the arcuate surface 148 of the fluid pathway cavity 140 is made from a material having a reflection coefficient that is greater than a reflection coefficient of non-arcuate surfaces of the optical transmission flow cell.

The arcuate surface 148 specifically is also at a first transition 149 between the second end section 146*c* of the first fluid pathway channel 144*a* and the optical pathway cavity 132. By providing the arcuate surface 148 in the first fluid pathway channel 144*a*, including at the first transition 149, air pockets, or bubbles are not caught, or formed within the optical pathway cavity 132 as a result of a sharply shaped transition. Similarly, the arcuate surface 158 is also at a second transition 159 between the second end section 156*c* of the second fluid pathway channel 144*b* and the optical pathway. Again, by avoiding a sharp transition by providing the arcuate surface 158, air pockets are not caught in the optical pathway cavity 132, providing improved readings through the optical pathway cavity 132.

Based on the formation of the first fluid pathway channel 144*a*, the first fluid pathway channel 144*a* includes an interior wall 150 and an exterior wall 152, where the material adjacent the interior wall 150 has a density greater than material adjacent the exterior wall 152. In all, by providing the first arcuate surface 148, or first arcuate loft surface, laminar flow within the first fluid pathway channel 144*a* is promoted, or improved by reducing the formation of air pockets in fluid in a fluid flow path 114. Specifically, fluid pathway channels that include sharp edges instead of arcuate and loft surfaces cause stresses that result in the formation of air pockets. In addition, a smooth transition between fluid pathway channels is accomplished with an arcuate loft surface, whereas an edge does not provide for this smooth transition. Both the reduction of formation of the air pockets, and the smooth transition results in enhanced laminar flow. Consequently, detection efficiencies of the fluid flow cell 101 improve. Specifically, light traveling through air pockets may reflect and scatter and refract off the surfaces of the air pocket. As a result, less light is detected, and the light that is detected is more scattered, both resulting in reduced detection quality and reading accuracy.

The second fluid pathway channel 144*b* extends from a first end section 156*a* that is fluidly coupled with the outlet passage 142*b* to a middle section 156*b*. The middle section 156*b* extends from the first end section 156*a* to a second end section 156*c* that is fluidly coupled with the third fluid pathway channel 144*c*. The middle section 156*b* has a diameter that is greater than a diameter of the first end section 156*a* and greater than a diameter of the second end section 156*c*. In this manner, the fluid pathway cavity 140 includes a second arcuate surface 158 that may be a second lofted arcuate surface. The second arcuate surface 158 may be formed such that the middle section 156*b* ha a diameter that is greater than the diameter of the first end section 156*a* and second end section 156*c*. Specifically, in one example the first fluid pathway channel 154*a* is formed using an additive manufacturing process. In one embodiment the additive manufacturing process is printing through use of a 3D printer that includes spray nozzles.

In another example, the arcuate surface 158 is made from a material having a reflection coefficient that is greater than a reflection coefficient of non-arcuate surfaces of the optical transmission flow cell. In yet another example, the second arcuate surface 158 is formed from a material having a density that is greater than a density of material forming non-arcuate surfaces of the optical transmission flow cell 101. Based on the formation of the second fluid pathway channel 144*b*, the second fluid pathway channel 144*b* includes an interior wall 160 and an exterior wall 162, where the material adjacent the interior wall 160 has a density greater than material adjacent the exterior wall 162. In all, by providing the second arcuate surface 158, or second arcuate loft surface, laminar flow within the second fluid pathway channel 144b is promoted, or improved, reducing the amount of air pockets in fluid in a fluid flow path 114. Thus, detection efficiencies of the fluid flow cell 101 are improved as discussed in detail above.

The third fluid pathway channel 144c extends through and is part of the optical pathway cavity 140. As described above, in one example, the third fluid pathway channel 144c and the second optical flow pathway channel 134b are the same channel. The third fluid pathway channel 144c fluidly receives and is coupled transverse to the first fluid pathway channel 144a and the second fluid pathway channel 144b. In one example each of the first and second fluid pathway channel 144a and 144b is 90° to the third fluid pathway channel 144c. In other examples, as illustrated, each of the first and second fluid pathways 144a and 144b are in a range between 0°-180° to the third fluid pathway 144c. While in one example each of the first and second fluid pathway channels 144a and 144b are transverse to the third fluid pathway at identical or supplementary angles compared to one another, in other examples each of the first and second fluid pathway channels 144a and 144b are at angles to the third fluid pathway that are both different from one another, and not supplementary. While in the example of FIG. 3 the third fluid pathway channel 144c illustrates generally a constant diameter, in other embodiments the third fluid pathway includes arcuate loft surfaces or other surface shapes that promote, or enhance, laminar flow and reduce the formation of air pockets without effecting the optical pathway 106.

In the example of FIG. 3, first and second flanges 164 and 166 extend from the transparent inlet barrier 136 and transparent outlet barrier 138 respectfully, such that when fluid flows against the first flange 164 from against the first arcuate surface 148 of the first fluid pathway channel 144a, the fluid is directed along the fluid flow path 114 towards the third fluid pathway channel 144c. Similarly, the second flange 166 extends from the transparent outlet barrier 138 such that when fluid flows along the second flange 166, the fluid is directed upwardly into the second fluid pathway channel 144b against the second arcuate surface 158 and to the outlet passage 142b. In this manner, the first flange 164 directs fluid flow from the first arcuate surface 148, and the second flange 166 directs flow towards the second arcuate surface 158. Because a symmetrical system is provided, if fluid flow is reversed, the same advantages are realized.

Figure 4:
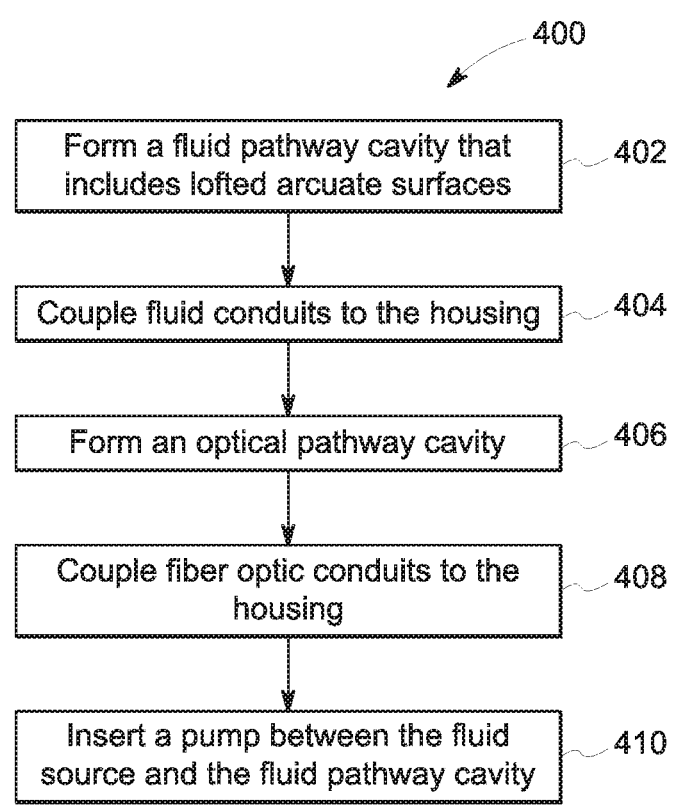
FIG. 4 is a schematic block flow diagram of a process for forming an optical transmission flow cell in accordance with embodiments herein.

FIG. 4 illustrates a flow process 400 for forming an optical transmission flow cell. In one example the optical transmission flow cell is the optical transmission flow cell 101 of FIGS. 1-3. The flow process 400 can include an additive manufacturing process that provides surfaces, tolerances, precision, and accuracy that a subtractive manufacturing process is unable to provide, including the formation of arcuate loft surfaces that provide an arcuate cross-section that cannot be accomplished through molding, boring, or removing material from a preexisting housing block.

At 402, a fluid pathway cavity is formed within a housing that includes lofted arcuate surfaces. In one example the fluid pathway cavity is formed through an additive process that in one embodiment is using a 3D printer. Specifically, an additive manufacturing process is provided to form the lofted arcuate surfaces by first specifying a network of curves that approximate the desired shape, and then interpolating, or inserting, these curves with a smooth surface through an additive manufacturing process. When using a 3D printer, the spray nozzles spray, or insert material along predetermined curves at predetermined locations in forming the fluid cavity to form the lofted arcuate shape. By controlling the amount of spray at the predetermined curves, the density of different sections of channels of the cavity may be controlled. Consequently, an inner, or more interior surface may be denser, while an outer, or more exterior surface may be less dense. Similarly, the different diameters of the different sections of channels of the cavity may also be controlled. Thus, by adding spray to end sections, a middle section of a channel may have a diameter that is greater than either end section of a channel. Alternatively, the middle section of the channel may have a diameter that is smaller than either end of the section of the channel. In either instance, the curved, rounded, or arcuate shape reduces, prevents, or eliminates the formation of air pockets within the optical pathway cavity.

The fluid pathway cavity may include plural fluid channels including an example embodiment that has three fluid channels as illustrated and described in relation to FIG. 3. In particular, the fluid pathway cavity includes any place within the housing that fluid is able to flow. Thus, in certain embodiments, barriers, including removable optical windows may be placed at different locations within the housing to alter the shape and size of the fluid pathway cavity.

When adding material during the formation of the fluid pathway cavity, at least one arcuate loft surface is formed within the fluid pathway cavity, where the at least one arcuate loft surface is configured to promote laminar flow of fluid within the fluid pathway cavity. In one example the material added to form the at least one arcuate surface has a reflection coefficient that is greater than a reflection coefficient of non-arcuate surfaces of the optical transmission flow cell. In yet another example, the at least arcuate loft surface is formed from a material having a density that is greater than a density of material forming non-arcuate surfaces of the optical transmission flow cell. In one example the material added within the fluid cavity to form the arcuate loft surface is added to an interior wall and not on an exterior wall, where the interior wall is closer to the center axis of the housing than the exterior wall. In such an example the material adjacent the interior wall may have a density greater than material adjacent the exterior wall. Specifically, the exterior wall may have a planer tangential surface and the inner wall has an arcuate tangential surface. In each instance, the added material that results in the forming of an arcuate loft surface promotes laminar flow and reduces the formation of air pockets such as bubbles within the fluid flow path to improve accuracy of measurement through the flow cell. Promoting laminar flow includes improving laminar flow and functioning to partake in actions that may improve laminar flow.

At 404, fluid conduits are coupled to the housing to provide fluid into and from the housing. In one example, an inlet fluid conduit is mechanically coupled to the housing to provide fluid communication between the inlet fluid conduit and the fluid pathway cavity. The inlet fluid conduit may be configured to fluidly couple to a fluid source. The fluid source may be a reservoir, tank, container, beaker, or the like that contains a fluid that is analyzed using light in association with a detector. An outlet fluid conduit may also be coupled to the housing to provide fluid communication between the fluid pathway cavity and the outlet fluid conduit. In this manner fluid is conveyed to and from the housing.

At 406, an optical pathway cavity is formed through the housing that is transverse to the fluid pathway cavity. In one example the optical pathway cavity similar to the fluid pathway cavity is formed through an additive process that in one embodiment is using a 3D printer. The optical pathway cavity and fluid pathway cavity may be formed at the same time during the manufacturing process wherein the optical pathway cavity and fluid pathway cavity intersect one another and are formed from many of the same surfaces, if not all of the same surfaces within the housing. Specifically, the optical pathway cavity is configured to receive an optical fiber to emit light through the fluid pathway cavity. In particular, the optical pathway cavity is anywhere within the housing in which light from an energy source is provided. This includes light running along an optical fiber that is disposed within the housing, and light that emits or is received by an optical fiber and is emitted though air, fluid, or other medium within the housing. In one example transparent barriers such as optical windows may be placed within the optical pathway cavity that allow the emission of light therethrough and prevent the flow of fluid therethough. When formed, the optical pathway cavity and fluid flow cavity may be transverse from one another, or portions of one another. This includes at angles in a range between 0° and 180°.

At 408, fiber optic conduits are coupled to the housing to provide an optical pathway through the housing. An inlet fiber optic conduit may be removably coupled to the housing to provide an inlet light into the housing. The inlet fiber optic conduit may be removably coupled using a nut element, or other mechanical coupling to provide the removable coupling. The inlet fiber optic conduit may be coupled to an energy source that may be a light source and configured to provide light into the optical transmission flow cell. The energy source may be one of ultraviolet, infrared, visible, or the like. Similarly, an outlet fiber optic conduit may be coupled to the housing along the optical pathway and be configured to be coupled to a detector. In this manner, light is disposed into the housing along the optical pathway along the fiber optic, transmitted through a fluid within the optical and fluid pathways, and received by a fiber optic of the outlet fiber optic conduit to be transmitted to a detector for analysis.

At 410, a pump is inserted between the fluid source and the fluid pathway cavity. In one example, the pump is configured to convey fluid from the fluid source to the fluid pathway cavity. Again, the fluid source may include any of a reservoir, tank, container, beaker, or the like where the pump may control the flow of fluid as desired for analyzing the fluid within the fluid flow cell.

For testing of performance of two transmission flow cells, air pockets in the form of air bubbles were introduced into the liquid flow by increasing the speed of the pump in a step fashion and quickly bringing the speed back to a normal speed of ~0.5 liters per minute. These flow speed changes were performed in replicates (n=2-3) to obtain statistics of measurements. FIGS. 5A-7B compare the performance of the new transmission flow cell with loft surfaces fabricated using additive manufacturing and a conventional transmission flow cell fabricated using subtractive manufacturing. The comparisons were performed at different speeds of liquid flow such as slow, medium, and high speeds, related to approximately 1, 2, and 3 L/min. In these measurements, the key factor was the stability of response during the periods of time when the flow cell was under a constant flow rate. The regions of stability of response during the periods of time when the flow cell was under a constant flow rate are highlighted with boxes for the new flow cells in FIG. 5A, FIG. 6A, and FIG. 7A and for conventional flow cells in FIG. 5B, FIG. 6B, and FIG. 7B, respectively.

Figure 5A:
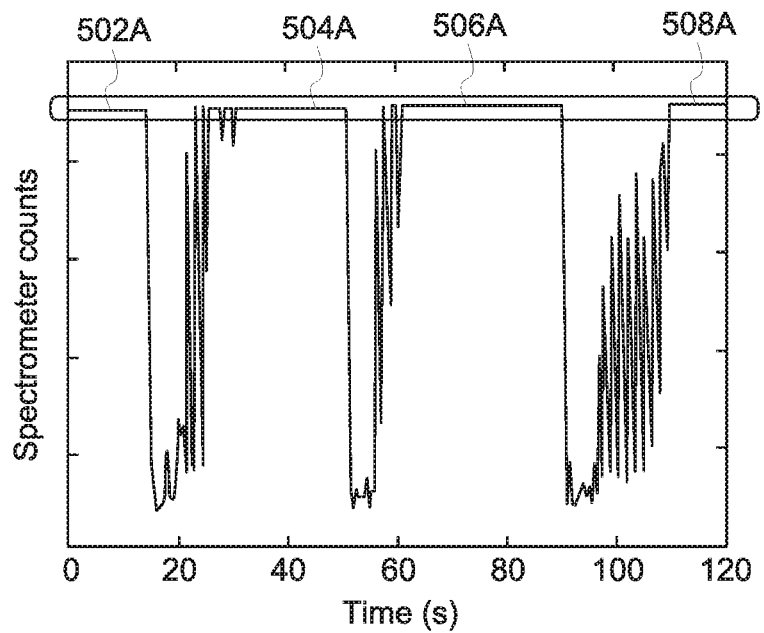
FIG. 5A is a graph of spectrometer counts over time measured by an optical transmission flow cell in accordance with embodiments herein.

FIG. 5A illustrates a graph of spectrometer counts over time using optical transmission flow cell and methods as described herein by at least FIGS. 1-4 using the testing methodology described for slow speed (1 L/min). Specifically, regions 502A, 504A, 506A, and 508A each illustrate regions of response stability when the cells were under a constant flow rate were within the optical transmission flow cell.

Figure 5B:
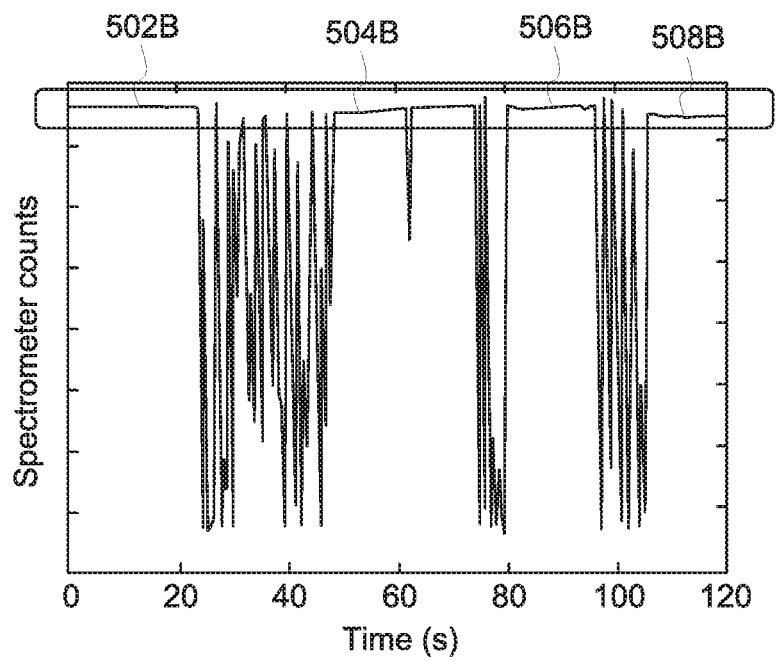
FIG. 5B is a graph of spectrometer counts over time measured by an optical transmission flow cell.

FIG. 5B illustrates a graph of spectrometer counts over time using an optical transmission flow cell and methods where the optical transmission flow cell was made using a subtractive manufacturing method and not providing the lofted surfaces contemplated with relation to FIGS. 1-4. In this graph, the same slow fluid flow rate (1 L/min) was used resulting in corresponding regions 502B, 504B, 506B, and 508B that are noticeably less stable and sporadic. Specifically, because a subtractive manufacturing process was used instead of an additive manufacturing process that added lofted surfaces, the counts were not as consistent, or accurate. Consequently, the lofted surfaces result is more consistent results compared to an optical transmission flow cell using a subtractive manufacturing process that does not provide lofted surfaces during slow liquid flow through the optical transmission flow cell.

Figure 6A:
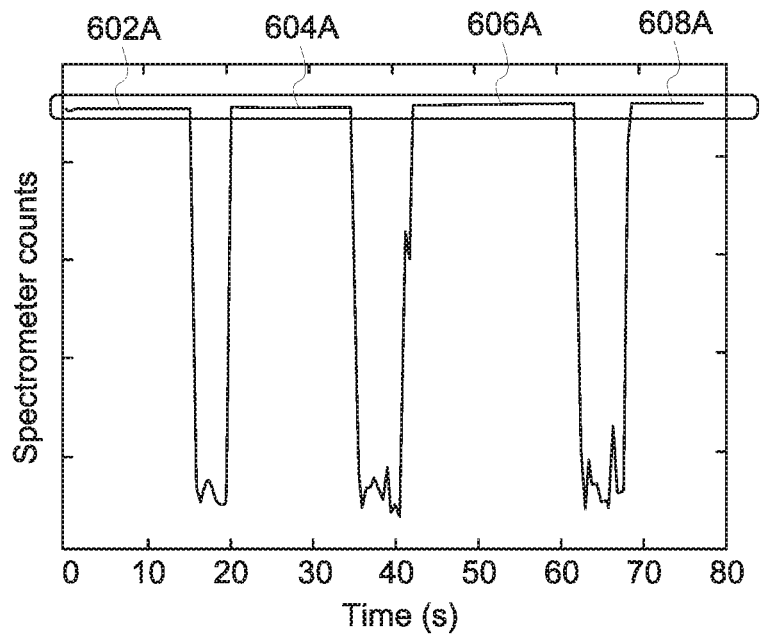
FIG. 6A is a graph of spectrometer counts over time measured by an optical transmission flow cell in accordance with embodiments herein.
Figure 6B:
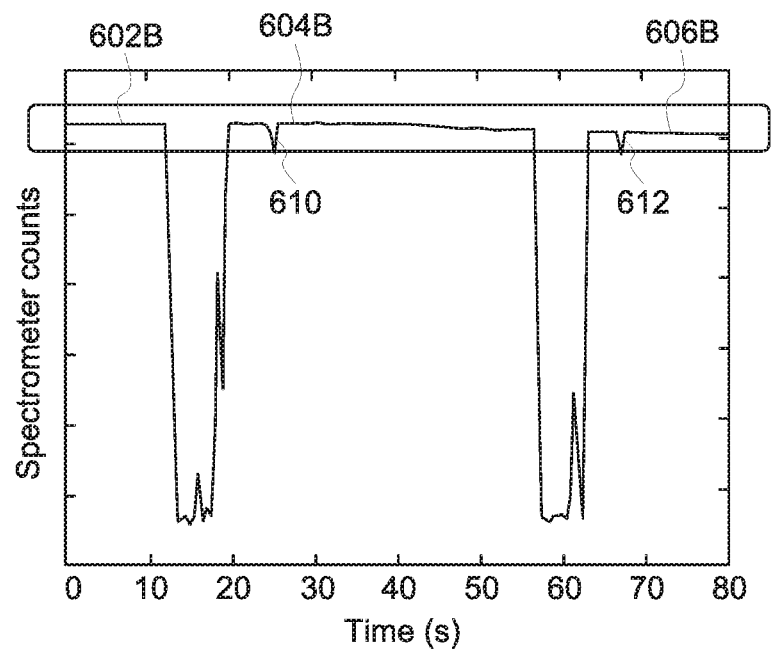
FIG. 6B is a graph of spectrometer counts over time measured by an optical transmission flow cell.

FIGS. 6A and 6B illustrate additional graphs of optical transmission flow cells performance by plotting spectrometer counts over time. In this example, medium fluid flow speed (2 L/min) is provide through each optical transmission flow cell, where the flow cell of FIG. 6A is made as described in relation to FIGS. 1-4 herein including using an additive manufacturing process and forming lofted surfaces, while FIG. 6B represent reading taken from optical transmission flow cell using a subtractive manufacturing process and not including lofted surfaces. Again, the reading received from the flow cell of FIG. 6A includes stable regions 602A, 604A, 606A, and 608A, whereas the flow cell of FIG. 6B includes unstable and inconsistent regions 602B, 604B, and 606B where variance points 610 and 612 are detected. So, user a medium flow (2 L/min), again, variance is eliminated when it comes to using the optical transmission flow cell as described herein using additive manufacturing processes and lofted surfaces compared to subtractive manufacturing processes.

Figure 7A:
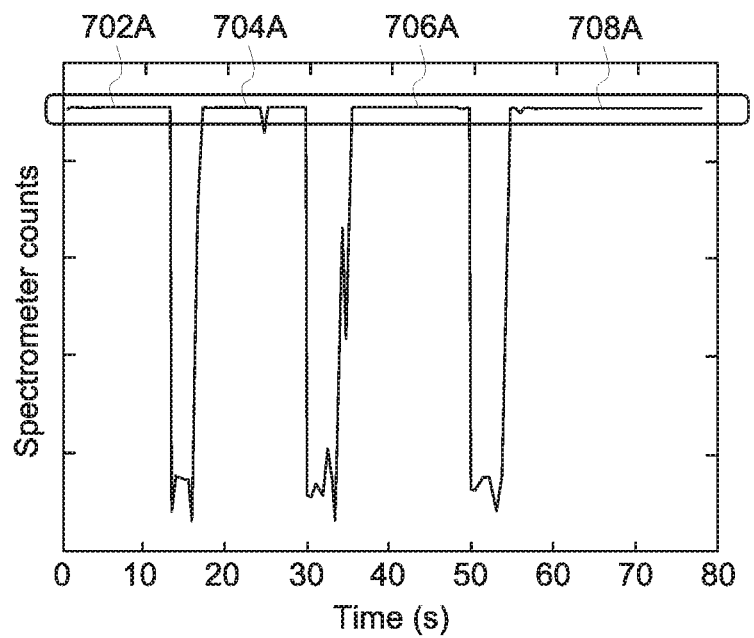
FIG. 7A is a graph of spectrometer counts over time measured by an optical transmission flow cell in accordance with embodiments herein.
Figure 7B:
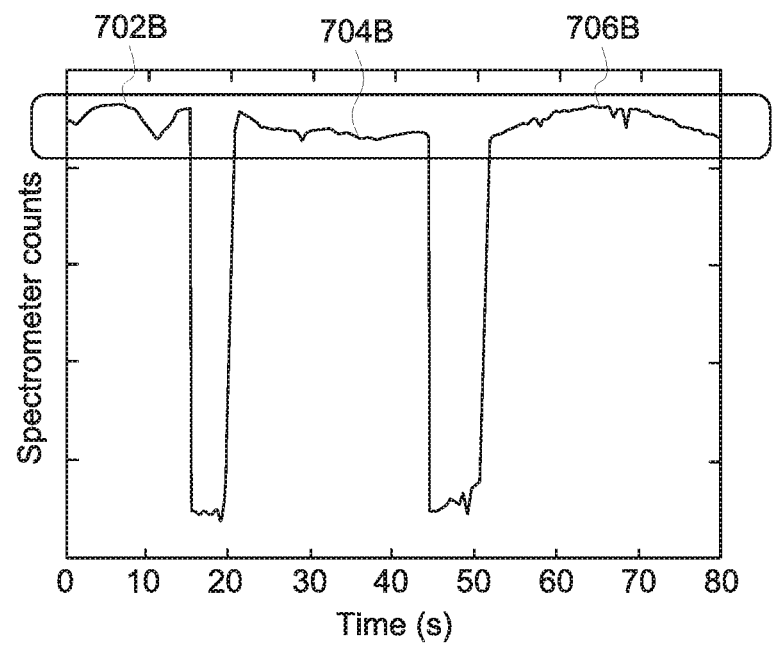
FIG. 7B is a graph of spectrometer counts over time measured by an optical transmission flow cell.

FIGS. 7A and 7B again illustrate additional graphs of optical transmission flow cells performance by plotting spectrometer counts over time. In this example, fast fluid flow speed (3 L/min) is provide through each optical transmission flow cell, where the flow cell of FIG. 7A is made as described in relation to FIGS. 1-4 herein including using an additive manufacturing process and forming lofted surfaces, while FIG. 7B represent reading taken from optical transmission flow cell using a subtractive manufacturing process and not including lofted surfaces. Again, the reading received from the flow cell of FIG. 7A includes stable regions 702A, 704A, 706A, and 708A, whereas the flow cell of FIG. 7B includes unstable and inconsistent regions 702B, 704B, and 706C. While the fast fluid speed results in greater variance in the regions 702A, 704A, 706A, and 708A for the flow cell described herein, the regions 702B, 704B, and 706B show vast variance in each region that can cause error. This error can cause error in identifying substances. So, using a fast flow (3 L/min), again, variance is eliminated when it comes to using the optical transmission flow cell as described herein using additive manufacturing processes and lofted surfaces compared to subtractive manufacturing processes. This allows for faster testing methodologies to be developed that include more accurate and precise results compared to using flow cell using a subtractive manufacturing process.

Thus provided is an optical transmission flow cell for monitoring of fluids. To eliminate the drawback of formation of air pockets such as air bubbles during measurements of fluids on edge surfaces of the inside hollow parts of the cell, the inside surfaces of the cell have lofting curves.

The loft surfaces inside the cell prevent the formation of the air pockets in an optical pathway. To realize such probe design, a new type of manufacturing method is implemented that may allow fabrication of the loft surface features that are difficult or impossible to fabricate using subtractive manufacturing. The flow cell is fabricated using additive manufacturing, which is fabrication of objects through the deposition of a material using a print head, nozzle or other printer technology. The subtractive manufacturing or subtractive fabrication involves cutting away from a solid block of material. This process does not allow production of loft surface features enclosed inside the hollow components. Molding manufacturing process involves shaping a liquid or a pliable material such as plastic, glass, metal, or ceramic raw material using a rigid frame known as a mold. Molding and subtractive manufacturing processes do not allow position-controlled surface functionalization.

One structural difference in the design of the disclosed transmission flow cell as compared other transmission flow cells is in the design of inner surfaces of the cell that are designed as loft surfaces.

Another structural difference in the design of the disclosed transmission flow cell as compared to other transmission flow cells is in the material composition of inner surfaces of the cell. The inner surfaces of the cell have different composition, for example by local functionalization, to enhance optical properties of the cell. Other manufacturing methods such as subtractive manufacturing or mold manufacturing cannot achieve such position-controlled surface functionalization.

Another structural difference in the design of the disclosed transmission flow cell as compared to other transmission flow cells is in the material density of the cell. The material close to the inner surfaces of the cell is denser than the material close to outside surfaces. The material close to the threaded regions of the cell is denser than the material close to outside surfaces. Thus, the transmission flow cell has less mass as compared to the same geometry of the cell fabricated using classic subtractive manufacturing methods. For at least these reasons, at least all objectives have been met.

In one or more embodiments provided is a method of forming an optical transmission flow cell that includes forming a fluid path cavity though a housing. The method also includes forming an optical pathway cavity through the housing and through the fluid pathway cavity, the optical pathway cavity configured to receive an optical fiber to emit light through the fluid pathway cavity, and adding material at a transition between the optical pathway cavity and fluid pathway cavity to form a surface at the transition configured to prevent formation of air pockets within fluid in the optical pathway cavity.

Optionally, forming the fluid pathway cavity includes forming at least one channel of the fluid pathway cavity that intersects the optical pathway cavity. In one aspect, forming the at least one channel includes forming the at least one channel to insect with the fluid pathway cavity at an angle in a range between 30° and 150°.

In another aspect, adding the material at the transition of the optical pathway cavity and fluid pathway cavity includes printing the material. Optionally, printing the material includes lofting the material to form at least one arcuate loft surface.

In another example, the method also includes coupling an inlet fiber optic conduit to the housing to provide an optical pathway into the housing, and coupling an outlet fiber optic conduit to the housing along the optical pathway and configured to be coupled to a detector. Optionally, the method also includes coupling an inlet fluid conduit to the housing to provide fluid communication between the inlet fluid conduit and the fluid pathway cavity, the inlet fluid conduit configured to fluidly couple to a fluid source, and coupling an outlet fluid conduit to the housing to provide fluid communication between the fluid pathway cavity and the outlet fluid conduit. In another aspect, the method additionally includes inserting a pump between the fluid source and the fluid pathway cavity, the pump configured to convey fluid from the fluid source to the fluid pathway cavity.

In one or more embodiments a sensor probe assembly is provided that includes an energy source and an optical transmission flow cell receiving a light input from the energy source along an optical pathway within an optical pathway cavity and coupled to a detector so that the light from the energy source is delivered to the detector. The optical transmission flow cell includes a fluid pathway cavity having an arcuate surface that intersects with the optical pathway cavity at a transition so that a fluid flow path from a fluid pathway cavity inlet to a fluid pathway cavity outlet is within the optical pathway. A fluid source is fluidly coupled to the optical transmission flow cell and configured to supply fluid into the fluid pathway cavity against an arcuate surface at the transition that prevents formation of air pockets in the fluid within the optical pathway along the fluid flow path.

Optionally, the sensor probe assembly also includes an inlet fiber optic conduit mechanically coupled to the optical transmission flow cell, the inlet fiber optic conduit including a fiber optic cable coupled to the energy source and configured to provide the light input into the optical transmission flow cell. In another aspect, the energy source is an ultraviolet, visible, infrared energy source or any of the combinations. In yet another aspect, the arcuate surface at the transition is made from a material having a reflection coefficient that is less than a reflection coefficient of non-arcuate surfaces of the optical transmission flow cell.

In an example, the arcuate surface at the transition is formed from a material having a density that is greater than a density of material forming non-arcuate surfaces of the optical transmission flow cell. In an aspect, the fluid pathway cavity includes a first fluid pathway channel and a second fluid pathway channel; the first fluid pathway channel having a first end section, a middle section, and a second end section, wherein the middle section has a diameter that is greater than a diameter of the first end section, and greater than a diameter of the second end section. Alternatively, the first fluid pathway channel includes an interior wall and an exterior wall, and material adjacent the interior wall has a density greater than material adjacent the exterior wall.

Optionally, the first fluid pathway channel intersects the optical pathway cavity at a first angle in a range between 30° and 150° and the second fluid pathway channel intersects the optical pathway cavity at a second angle in a range between 30° and 150°. In another aspect the detector is a spectrograph.

In another example the sensor probe assembly also includes an inlet fiber optic conduit mechanically coupled to the optical pathway cavity and configured to provide the light from the energy source through the fluid in the fluid flow path after flowing against the arcuate surface of the fluid pathway cavity. The sensor probe assembly also includes an outlet fiber optic cable disposed therein coupled to the optical cavity that is configured to receive the light after emitting through the fluid in the fluid flow path after flowing against the arcuate surface to deliver the light to the detector.

Optionally, the sensor probe assembly also includes a computing device coupled to the detector that is configured to receive detector data based on the light delivered from the energy source. In another aspect, the energy source is an ultraviolet energy source.

In one or more embodiments a method of forming an optical transmission flow cell is provided that includes printing a housing having a fluid pathway cavity disposed therethrough. The fluid pathway cavity includes a first fluid pathway channel and a second fluid pathway channel. During the printing of the housing, the method includes lofting a first arcuate loft surface at a first transition between the first fluid pathway channel and an optical pathway cavity, and lofting a second arcuate loft surface at a second transition between the second fluid pathway channel and the optical pathway cavity. Also during the printing of the housing, the method includes forming the optical pathway cavity disposed through the housing and transverse to the fluid pathway cavity to create a fluid flow path through the first fluid pathway channel against the first arcuate loft surface, into the optical pathway cavity, and through the second fluid pathway channel against the second arcuate loft surface. The optical pathway cavity is configured to cause a projection of light therethrough to be disposed through a fluid in the fluid flow path after passing through the first fluid pathway channel and against the first arcuate loft surface to prevent formation of air pockets within the fluid in the optical pathway cavity.

Optionally, the first fluid pathway channel printed has a first end section, a middle section, and a second end section, wherein the middle section has a diameter that is greater than a diameter of the first end section, and greater than a diameter of the second end section. In another aspect, the method also includes coupling an inlet fiber optic conduit to the housing to provide an optical pathway into the housing to cause the projection of the light disposed through the fluid in the fluid flow path, and coupling an outlet fiber optic conduit to the housing along the optical pathway and configured to be coupled to a detector.

In an example, the method also includes coupling an inlet fluid conduit to the housing to provide fluid communication between the inlet fluid conduit and the first fluid pathway channel, the inlet fluid conduit configured to fluidly couple to a fluid source, and coupling an outlet fluid conduit to the housing to provide fluid communication between the second fluid pathway channel and the outlet fluid conduit. Optionally, the method also includes inserting a pump between the fluid source and the inlet fluid conduit, the pump configured to convey fluid from the fluid source to the inlet fluid conduit.

While the present disclosure has been described in terms of one or more particular embodiments, it is apparent that other forms could be adopted by one skilled in the art. It is to be understood that the use of "comprising" in conjunction with the alloy compositions described herein specifically discloses and includes the embodiments wherein the alloy compositions "consist essentially of" the named components (i.e., contain the named components and no other components that significantly adversely affect the basic and novel features disclosed), and embodiments wherein the alloy compositions "consist of" the named components (i.e., contain only the named components except for contaminants which are naturally and inevitably present in each of the named components).

This written description uses examples to disclose the present disclosure, including the best mode, and also to enable any person skilled in the art to practice the present disclosure, including making and using any devices or systems and performing any incorporated methods. The patentable scope of the present disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of forming an optical transmission flow cell comprising:
    printing a housing having a fluid pathway cavity disposed therethrough; the fluid pathway cavity including a first fluid pathway channel and a second fluid pathway channel;
    during the printing of the housing, lofting a first arcuate loft surface at a first transition between the first fluid pathway channel and an optical pathway cavity, and lofting a second arcuate loft surface at a second transition between the second fluid pathway channel and the optical pathway cavity;
    during the printing of the housing, forming the optical pathway cavity disposed through the housing and transverse to the fluid pathway cavity to create a fluid flow path through the first fluid pathway channel against the first arcuate loft surface, into the optical pathway cavity, and through the second fluid pathway channel against the second arcuate loft surface;
    wherein the optical pathway cavity is configured to cause a projection of light therethrough to be disposed through a fluid in the fluid flow path after passing through the first fluid pathway channel and against the first arcuate loft surface to prevent formation of air pockets within the fluid in the optical pathway cavity.

2. The method of claim 1, wherein forming the optical pathway cavity disposed through the housing and transverse to the fluid pathway cavity includes forming the optical pathway cavity to insect with at least one of the first fluid pathway channel or the second fluid pathway channel of the fluid pathway cavity at an angle in a range between 30° and 150°.

3. The method of claim 1, further comprising:
    coupling an inlet fiber optic conduit to the housing to provide an optical pathway into the housing to cause the projection of the light disposed through the fluid in the fluid flow path; and
    coupling an outlet fiber optic conduit to the housing along the optical pathway and configured to be coupled to a detector.

4. The method of claim 3, further comprising:
    coupling an inlet fluid conduit to the housing to provide fluid communication between the inlet fluid conduit and the first fluid pathway channel, the inlet fluid conduit configured to fluidly couple to a fluid source; and coupling an outlet fluid conduit to the housing to provide fluid communication between the second fluid pathway channel and the outlet fluid conduit.

5. The method of claim 4, further comprising:

inserting a pump between the fluid source and the fluid pathway cavity, the pump configured to convey fluid from the fluid source to the fluid pathway cavity.

6. The method of claim 3, further comprising receiving a light input from an energy source along the optical pathway within the optical pathway cavity.

7. The method of claim 6, wherein the energy source is one or more of an ultraviolet light source, a visible light source, or an infrared light source.

8. The method of claim 6, further comprising receiving the light input from the energy source at a detector.

9. The method of claim 3, wherein the inlet fluid conduit is mechanically coupled to the housing.

10. The method of claim 3, wherein the outlet fluid conduit is mechanically coupled to the housing.

11. The method of claim 1, wherein a three dimensional printer prints the housing.

12. The method of claim 1, wherein the first arcuate loft surface is made from a material having a reflection coefficient that is less than a reflection coefficient of non-arcuate loft surfaces of the optical transmission flow cell.

13. The method of claim 1, wherein the first arcuate loft surface is formed from a material having a density that is greater than a density of material forming non-arcuate loft surfaces of the optical transmission flow cell.

14. The method of claim 1, wherein the first fluid pathway channel has a first end section, a middle section, and a second end section, wherein the middle section has a diameter that is greater than a diameter of the first end section, and greater than a diameter of the second end section.

15. The method of claim 14, wherein the first fluid pathway channel includes an interior wall and an exterior wall, and material adjacent the interior wall has a density greater than material adjacent the exterior wall.

16. The method of claim 14, wherein the first fluid pathway channel intersects the optical pathway cavity at a first angle in a range between 30° and 150° and the second fluid pathway channel intersects the optical pathway cavity at a second angle in a range between 30° and 150°.

* * * * *